2,732,508

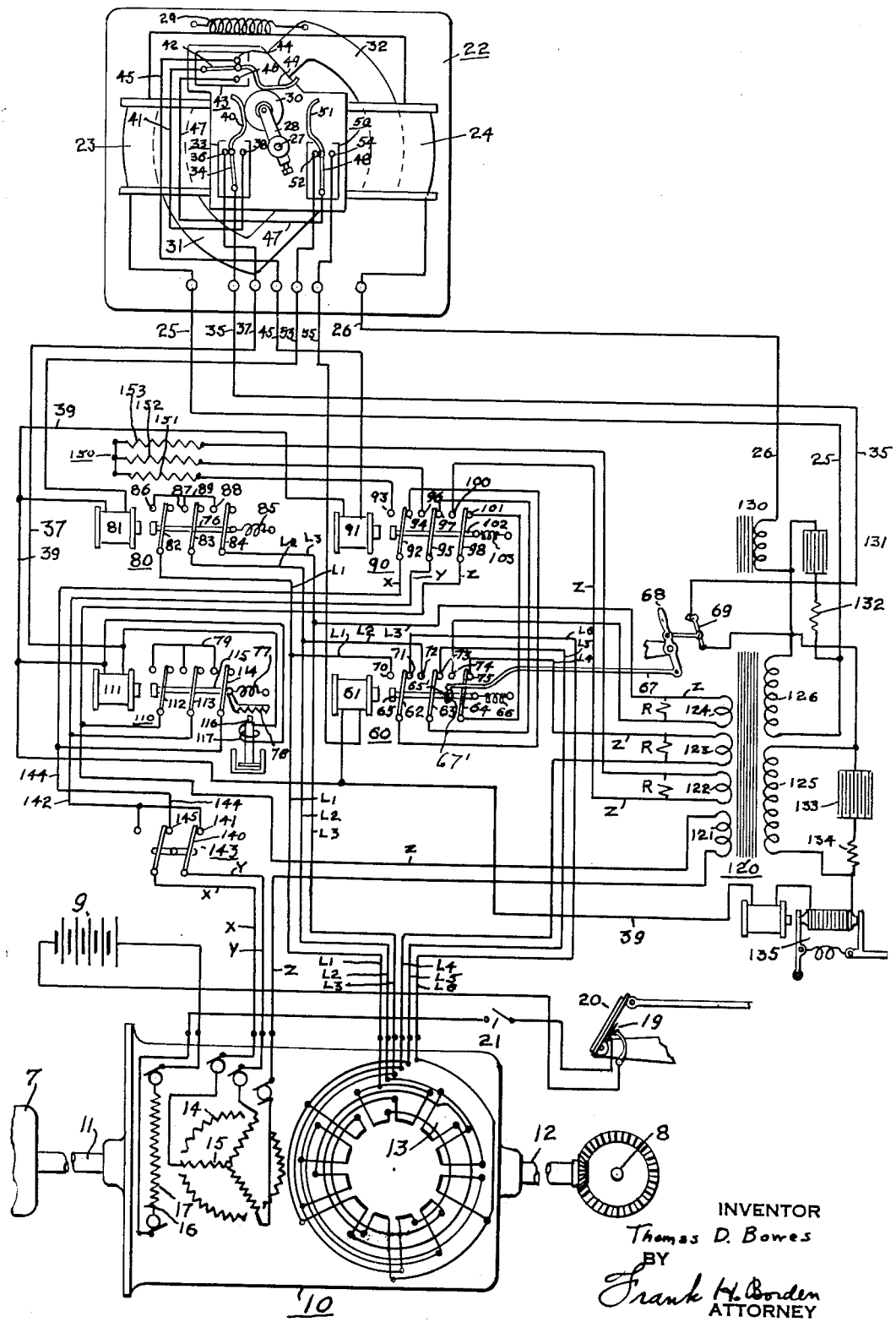

ELECTRICAL AUTOMOTIVE TRANSMISSION SYSTEM WITH CHANGEABLE RATIOS

Thomas D. Bowes, Bala-Cynwyd, Pa.

Application November 5, 1952, Serial No. 318,945

9 Claims. (Cl. 310—102)

This invention relates to transmission systems with changeable ratios.

In transmission systems for automotive devices of the automatically changeable type, as typified by the well known "Hydramatic" drive, in its various forms, for instance, it has been considered essential that when the car is stationary and the engine idling, the transmission is automatically of high ratio, i. e. in low gear. This is an automatic function of reducing car speed and coming to a standstill as in response to a stop light signal. Any increase in the power output of the motor from a standstill, regardless of conditions affecting the car, energizes the system in the low gear, and progresses it automatically through second, third and into the (usually) 1:1 high gear, of low ratio. This conventional "up shift" progression from low or first gear into high or fourth gear, of course, is actually a progression from high ratio to low ratio in terms of relative rotational speeds of the input and output shafts of the drive. In its functioning it is organized to respond to instantaneous load conditions on the output shaft of the drive, as from the rear axle, for instance. Each subsequent drop in car speed below a critical value, as in coming to or toward a stop, is automatically accompanied or followed by a conventional "down shift" back to the low gear organization, even though in terms of coupling between the motor and rear axle it is a down shift from high directly to low. I have determined that this order of progression is undesirable from many standpoints. It wastes energy in the form of undue consumption of fuel; it precludes utilization of gravitational factors in the initial or weight characteristics of the load, i. e. whether light or heavy; and immediately succeeding motion from standstill, as the shift is a result of governor action based on rear axle speed, it causes creep of the car at idling speeds, necessitating manual braking; and, finally, it is unnecessary.

It is among the objects of this invention to effect a transmission of automatically changing ratio for automotive devices, in which the ratio changes are the reverse of conventional so that at standstill the ratio is 1:1, in so-called "high gear," and only changes downwardly in a down shift in response to instantaneous conditions affecting the vehicle, just far enough to take up the load, pursuant to which it automatically reverses the order of ratio change and returns by up shift to the 1:1 ratio; to provide an automatic transmission which automatically changes the ratio of input to output entirely as a function of the resultant torque requirements, whether transitorily or lastingly developed; to provide an automatic transmission which automatically changes the ratio of input to output to accord with the instantaneous load demands without any indicating or actuating means on or operated by either the input or output shafts; to provide an automatic transmission which changes the ratio as a function solely of the load; to provide an automatic transmission with a normal high gear ratio at rest (1:1), maintained at all times except such times as the torque component of the engine power is insufficient to carry the load in the 1:1 ratio, and in which in automatic response to such condition the transmission is down-shifted to a ratio such that the instantaneously available torque is sufficiently large as to do the work instantaneously demanded; to provide an automatic transmission of a plurality of ratios of input to output applicable to any automotive device, whether automobile or truck, boats, aircraft, or any other organization in which a power plant is to develop rotations of an output shaft in proper torque-speed ratio; to provide an automatic transmission responsive to instantaneous load conditions for shifting the ratio of input to output with a faster response to load conditions than has heretofore been possible; to increase the rate of acceleration of automotive vehicle; and to provide other objects and advantages as will become more apparent as the description proceeds.

In carrying out the invention in an illustrative exemplification, it is preferred to use the dynamoelectric drive of Bowes Patent 2,465,006, and the development thereof into a changeable ratio transmission as described and claimed in application Serial Number 318,944, filed of even date herewith. This particular transmission device is used for simplicity and efficiency as well as compactness, but purely for purposes of illustration, and in the broader aspects of the invention the only requirement of the transmission is that it be susceptible to at least two, and preferably, at least for automotive purposes, four changes of ratio between input and output, which may be found in mechanical, hydraulic, or electric devices, or selected combinations thereof.

In the accompanying drawing forming part of this description:

The figure represents a diagram of the circuit incorporating the transmission unit and the circuit-controlling system by which the automatic ratio changes, as well as reversal of the transmission is effected.

In carrying out the invention in the purely illustrative embodiment shown in the diagram, the transmission unit preferably, but illustratively, used comprises a generally unitary housing 10 mounting an input or driving shaft 11, and an output or driven shaft 12. The housing is provided for suitable anchorage in the line between the prime mover, such, for instance, as an internal combustion engine 7, furnishing the power for the vehicle, for coupling to the driving or input shaft 11, and the load represented, illustratively, by the rear axle 8 of the vehicle. The anchorage illustratively will be on the frame of the automotive vehicle (not shown) hereinafter identified as "car." Fixed within the housing 10 is the stators 13 of the motor portion of the transmission, which has, illustratively, a two-speed compound winding, illustratively of four and eight poles respectively, but which may be of any desired number of poles such as six and twelve, ten and twenty, etc., provided they are multiples of the number of poles of the generator rotor to be described. The input leads or conductors for the motor windings for the illustrative eight pole organization are identified as L1, L2, and L3, while the input leads or conductors for the four pole organization are identified as L4, L5, and L6. Attached to the driven shaft 12 is a squirrel cage rotor 14, externally confronting the stator 13, and forming therewith a motor.

The driven shaft 12, internally of and on the squirrel cage also mounts a rotatable generator armature 15, having three slip ring connected output leads, respectively x, y, and z, for the respective phase outputs from a polyphase generator. The generator is formed by the rotatable generator armature 15, and the rotor 16 mounted on driving shaft 11. The rotor 16 is disposed in confronting concentric relation to the generator armature 15, and is suitably poled with a plurality of poles, say, for example, two, and is excited by the winding 17, energized through slip rings with D. C. current from any suitable source, such, for instance, as the battery 9. The circuit between the battery 9 and the slip rings is controlled by two switches, of which switch 19 is controlled in its opening and closing by a manually operated device, such, for instance, as the foot throttle 20 which also controls the fuel to and thus the speed of the motor 7. Any suitable number of additional or auxiliary switches, such as indicated by the single manual switch 21, may be used to control the excitation of the winding 17 of the rotor 16. It will be clear that substantially no currents are generated by the rotations of rotor 16 in and relative to generator armature 15, unless and until the exciting winding 17 is energized by closing both switches 19 and 21, and that current generation stops substantially simultaneously with interruption of the energizing current by opening either of switches 19 or 21.

A pilot relay is provided as indicated at 22, which is substantially immune to vibrations and accelerations and is responsive solely to current supply and variations thereof. This relay forms the subject matter of application Ser. No. 299,435, filed July 17, 1952, now matured into Patent No. 2,636,095 to which reference may be made for detailed descriptions and analysis. Suffice it at this point to note that the relay has two series-connected individual hollow solenoid coils 23 and 24, the supply leads of which are identified as 25 and 26 respectively. A shaft 27 is suitably journalled between the coils, normal to a median plane passing through the axes of the bores of the coils, and mounts a perpendicularly extending arm 28 carrying the terminal switch contact-controlling roller 30, on an axis parallel with the axis of shaft 27. A pair of armature or core arms 31 and 32 are mounted on the shaft 27, in position respectively to be drawn into the respective bores of the coils in response to the energization of the relay according to the current passing through leads 25 and 26. The shaft 27 is mechanically biased against the electrical bias of the coils and armatures and toward a limit stop (not shown) by a suitable spring 29, so that movement of the core or armature legs 31 and 32 into and relative to the coils, by reason of energization of the coils is against the spring bias and away from the stop. A secondary limit stop (not shown) may be provided to limit the inward arm motion. It will be understood that preferably the center of mass of the arm 28, roller 30 and arms 31 and 32 is predeterminedly substantially centered on the axis of shaft 27. A complemental oppositely rotating equal mass (not shown) of the same rotative speed, or a complemental smaller mass of greater speed, is mounted on an auxiliary shaft (not shown) which is coupled to the shaft 27 by a mechanical coupling, such as by gearing or the like, with its center of mass on the axis of the auxiliary shaft, in order to preclude relay action due to accelerative forces and vibrations, as set forth in said application.

The pilot relay illustratively mounts three double pole switches respectively 33, 43, and 50, angularly spaced about the arcuate path of movement of roller 30 and about the axis of shaft 27 for selective actuation by the roller 30 on arm 28. In the order of operation, starting with the shaft 27 solely responsive to its spring bias, in what I designate as its static rest position, and with the roller closer to coil 23 than to coil 24, i. e. in its maximum anticlockwise disposition, fixed by such limit stop, switch 33 has its resilient movable double contact arm or fulcrum 34, engaged and held in a normally closed contact relation with contact 36 by roller 30. Movable arm 34 is supplied by connector 35, and has a made, normally closed, or "on" connection with said contact 36, and the latter is joined to a connector 37. Switch 33 also mounts a normally open or unmade or "off" contact 38 in position to be made and closed by arm 34 when pressure thereon from roller 30 is released. Switch arm 34 has a bearing portion 40 engageable by roller 30 to control the contact-making and breaking position of arm 34, as the shaft 27 moves. Initially open or "off" contact 38 of switch 33 by connector 41 is joined to the resilient movable double contact arm or switch element 42, of the second switch 43. The switch element 42 of switch 43 in the position shown in the figure is in contact with "on" contact 44, joined to connector 45 and out of engagement with "off" contact 46, joined through connector 47, to the resilient movable arm 48 of the third switch 50. The movable arm 42 of the second switch has a wiping portion 49 for engagement by roller 30, and in the clockwise motion of the shaft 27 from the initial position shown, is permitted to move away from "on" contact 44, and to make contact with contact 46. Further clockwise motion of the roller 30 engages the wiping portion 51 of the resilient switch element 48 of the third switch 50. The third switch has a normally closed engagement between the arm 48 and "on" contact 52, completed to lead 53. Continued clockwise motion of the roller 30 about axis of shaft 27 breaks the established or normally made contact of switch arm 48 with "on" contact 52, and then makes it with fixed "off" contact 54, connected with a lead 55.

It will be understood that the switches disclosed are illustrative and that any other desired sort, such, for instance, as plural single throw, or single double throw "microswitches" or the like may be used at each switch point in substitution of switches 33, 43, and 50.

It may well be mentioned at this point that with a transmission such as is incorporated in the housing 10 as described, when the generator leads $x$, $y$, and $z$ are connected to the stator leads L1, L2 and L3 respectively, a transmission of the eight pole motor drive of high torque with low speed is acquired. This is the equivalent of "low" gear. When the stator leads L1, L2 and L3 are disconnected from generator leads $x$, $y$, and $z$, and short circuited, and the generator output leads $x$, $y$, and $z$ respectively are connected with the stator leads L4, L5, and L6, respectively, the transmission is with the four pole motor drive, effecting lower torque and higher speed. This is the substantial equivalent of "2nd" gear. Actually, the second gear ratio is with one half of the torque and twice the speed of the low gear ratio. In both low gear and 2nd gear the transmission functions as a torque converter. When all stator leads are short circuited, and the generator output $x$, $y$, and $z$ is connected to a three phase resistor, to be described, or its equivalent, the motor parts of the transmission are made inactive and the generator parts thereof form an electric slip clutch, which, on account of the resistor in the circuit has a considerable rate of slip to facilitate the smooth transition step of the normal torque of the motor 7, while being able to transmit a greater than normal torque, if such is available from the motor 7 with increased output speed. This is the substantial equivalent of "3rd" gear. Finally, cutting out such resistors and connecting the generator output leads in a short circuit with each other eliminates most but not all of the slip, the transmission still functions as a slip clutch, of small slip rate, so that the driven or output shaft 12 will run practically at the same speed as driving shaft 11, assuming, of course, that it is not overloaded. This is substantially 1:1 and is effectively "high" gear. This functioning of the transmission and the means for securing multiple ratios of input to output per se form the subject matter of said application Ser. No. 318,944, filed of even date herewith. This present application is directed, among other more basic features previously discussed, to the securing of the changes in ratios automatically as a function of the instantaneous load on the power plant, starting with a normal "high" gear ratio whenever the vehicle is at a standstill with the motor idling. It is to be observed that as all of the various ratios are all of asynchronous character, slipping will take place when overloaded at each step, and, most importantly, that the load will be measurably reflected in or by the current which circulates in the transmission. It is a feature of the invention to utilize the current or load, first, to operate the main power switches or relays, to be described, and secondly to provide the impulses and indications as to the instant that shifting from one ratio to another should occur. This automatic shifting and timing is solely a function of current effects in the transmission and does not rely upon auxiliary batteries, governors, load signals or any other devices heretofore considered essential in other forms of automatic transmissions. In effecting this important result it is contemplated to use a transformer 120 having two secondaries 125 and 126, with a main primary 121, and three compensating primaries 122, 123, and 124, with selective outputs from the secondaries, as will be explained. One secondary 126 of variable voltage output is used to control the pilot relay, and the other secondary 125 is used to actuate the power relays or contactors to effect switching between transmission ratios, as determined by the responses of the pilot relay. It will be evident, however, that although this may be preferred, the actuations of the system can be effected with the output of a single secondary, or that different separate transformers can be used, or the like.

In order to utilize currents flowing in the system, a series of relays or contactors and transformer elements and the like are incorporated in the system, in addition to the controlling pilot relay 22, as follows:

A "low gear" ratio control relay or contactor 60 is provided, having the actuating coil 61 and the three coupled switch elements 62, 63, and 64 for simultaneous actuation with a common armature 65, pulled in one direction magnetically when coil 61 is actuated and biased away from the coil by a spring 66. The core or armature 65 may be positively actuated toward the coil 61 by a hook 67' on link 67 engaging a pin 65' on the armature 65, actuated by a manual lever 68, which has an associated circuit control 69, to be described, when it is desired to keep the transmission in "low gear," as in snow, sand, or the like, or for reversing the drive. Relay 60 has a normally open or "off" contact 70 and a normally closed or "on" contact 71, selectively engaged by movable switch element 62. It has a normally open or "off" contact 72 and a normally closed or "on" contact 73 selectively engaged by movable switch element 63. It also has a normally open or "off" contact 74 and a normally closed or "on" contact 75 selectively engaged by switch element 64.

A "second gear" ratio control relay or contactor 80 is provided, having an actuating coil 81, and three switch elements, respectively 82, 83, and 84, movable with armature 76, between blind contacts to which they are normally biased by spring 85, and contacts respectively 86, 87, 88, all connected together in a short-circuiting connection 89. The switch elements 82, 83, and 84 of relay or contactor 80, and contacts 70, 72, and 74 of contactor 60, are respectively connected to the motor stator leads L1, L2 and L3.

A "third gear" ratio relay or contactor 90 is provided, having actuating coil 91, and three coupled movable switch elements 92, 95, and 98. Element 92 is movable between normally open or "off" contact 93 and closed or "on" contact 94, element 95 is movable between normally open or "off" contact 96, and closed or "on" contact 97, and switch element 98 is movable between normally open or "off" contact 100, and closed or "on" contact 101. These switch elements 92, 95, and 98 are operated by armature 102, biased away from coil 91 by spring 103.

Finally, a "high gear" ratio relay or contactor 110 is provided. This last relay or contactor comprises an actuating coil 111, and the three coupled switch elements 112, 113, and 114, mounted for movement with armature 115, biased by spring 77, and which has a ratchet terminal portion 78, for selective engagement by a dash pot-mounted pawl 116, controlled by a solenoid coil 117, which, when energized, engages the pawl with the ratchet and holds the relay in its actuated position, for reasons to be explained. There are three normally made or "on" blind contacts in relay 110 for the respective elements 112, 113, 114, and a series of "off" contacts joined by a short circuiting connection 79, for this "off" position of said elements when coil 111 is energized. The connections for the relay elements of relay or contactor 110 join these respectively with generator output leads $x$, $y$, and $z$, and the function of the relay is to short circuit the generator leads for the 1:1 high gear ratio.

As has been mentioned, a heavy duty transformer 120 is provided, comprising preferably four separate primary coils, respectively 121, of heavy wire, and compensator primaries 122, 123 and 124, which latter, if desired, may each have a resistor shunted across them, as indicated at "R" in the last three mentioned primary compensating coils. The transformer includes the said two secondaries, respectively 125 and 126.

The compensator windings are each of such number of turns or thickness of wire, or both, as predeterminedly respectively to induce different voltages in the secondaries 125 and 126, to apply the proper voltage on the actuating coils of the pilot relay so as to properly actuate the latter in accordance with the instant speed-torque transmission ratio sought from a given step in the progression thereon. The compensator windings carry current only when and as respective functions of the settings of the main contactors or relays occur. The compensating primaries strengthen the magnetic flux in the transformer core and may be reversely wound to weaken the flux; or they may have line or series resistances to modify the magnetic flux of the core to effect a desired output voltage from secondary 126. As will be pointed out, for simplicity, it is preferred that main primary 121 and the respective compensating primaries 122, 123, and 124, when energized, are all energized by generator output lead $z$. It will be clear that the respective compensator windings can be respectively engaged by the generator output leads $x$, $y$, and $z$. Many other changes and modifications can be used to effect the important result, i. e. that the voltage in the secondary which controls the pilot relay be controlled as a function of the load through the transmission on the motor 7. The compensator windings are stabilizing devices to effect maintenance of pilot relay at an attained setting despite fluctuations of current in the transmission at a constant motor speed.

One lead 26 of the pilot relay coils 23 and 24 leads preferably through choke coil 130, regulated by series-connected capacitor 131 and resistor 132, is connected to one end of secondary 126 of the transformer, the other end of which connects with input lead 25 of the pilot relay. Secondary 125, regulated by the series-connected capacitor 133 and resistance 134, has a carbonpile regulator 135 in its output and has one end in a return 39 common to all coils of the relays or contactors and the other end of the secondary 125 is fed selectively to the coils of the relays in response to functioning of the pilot relay 22.

Of the generator output leads $x$, $y$, and $z$, line $z$ leads through primary 121 and to the switch element 112 of relay 110, and also to switch element 98 of relay 90, and from contact 101, in the "on" or closed condition thereof to the switch element 64 of relay 60, and from the closed or "on" contact 75 thereof, through primary compensator coil 123, to L4. When relay 60 is actuated by closing switch element 48 with contact 54 of switch 50 of the pilot relay, the output lead $z$ passes through normally open or "off" contact 74, through compensator primary 124, to L3. In accordance with the later discussed voltages, this compensator winding, when thus energized, places a secondary voltage output of an illustrative 10 v. in secondary 126, despite changes in the voltage in main primary 121. The course of output $z$ through compensator winding 122 will be later described.

Generator output lead $y$ goes through reversing switch 143 and passes through switch element 140, to normally "on" contact 141, to a common line 142, in the normally "off" position of the reversing switch, from which it passes to switch element 113 of relay 110 (to be shorted when this relay is actuated), and to switch element 95 of relay 90, through normally made or "on" contact 97 thereof, to the switch element 63 of relay 60, and through normally made or "on" contact 73 thereof, to stator lead L5. When relay 60 is actuated the generator output y lead is connected through contact 72 of relay 60 with stator lead L2, and also with switch element 83 of relay 80, to shorted relation, when this latter relay is actuated.

Generator output lead x goes through reversing switch 143 and normally "on" contact 145 and passes through element 144 thereof, and through normally made or "on" contact 145, to switch element 114 of relay 110, and also to switch element 92 of relay 90, and through normally made or "on" contact 94, to switch element 62 of relay 60, and, through normally made or "on" contact 71 to stator lead L6. When relay 60 is actuated, this lead (x) communicates, through contact 70, with L1, and with switch element 82 of relay 80, to shorted relation when this latter relay is actuated.

A three-phase resistor 150 is provided, one resistor leg 151 of which leads to normally open or "off" contact 93 of relay 90, for communication with lead x when the relay 90 is actuated. A second resistor leg 152 is provided which leads to normally open contact 96 of relay 90, for communication with lead y when relay 90 is actuated. A third resistor leg 153 is provided, connected through compensator winding 122 of transformer 120, to normally open or "off" contact 100 of relay 90, for communication with lead z, when relay 90 is actuated. The compensator winding 122 is so organized relative to main winding 121 as to induce an illustrative 11 volts in the secondaries 126 of transformer 120 and to substantially maintain this despite fluctuations in current in the winding 121 of the transformer 120, during switchover between stages.

The main relays or contactors, and the transformer organization, having been described, the relations of the pilot relay connections thereto will next be considered.

One end of secondary 125 connects across the carbon-pile regulator 135 to a return line 39 common to one end of each of the coils of the main relays 60, 110, 80, and 90. The supply from the other end of secondary 125 is across manual switch 69 to lead 35 to switch member 34 of switch 33 of the pilot relay, and from contact 36, by lead 37, to coil 111 of relay 110, and also to the solenoid coil 177 of the dash pot pawl detent 116. From switch 33, through contact 38 and lead 41, the supply passes to the switch member 42 and through contact 44 and line 45 to coil 91 of relay 90. From switch 43, through contact 46 thereof and connector 47, the supply passes into switch member 48 of switch 50 and through contact 52 and connector 53 to coil 81 of relay 80. Finally, from switch 50 through contact 54 and line 55 the secondary supply passes to the coil 61 of relay 60.

The normally closed manual switch 69, when opened, by removing the supply current from secondary 125 to the various main relays precludes the operation thereof, and at the same time manipulation of the lever 68 to open switch 69, by link 67, actuates relay armature 65 of relay 60, to force the switch members to engage the leads for the eight pole motor organization, and thus maintains the transmission in low gear of high ratio for all conditions requiring same. This is also established synchronously with the switching of reversing switch 143, so that reversal of the transmission or drive is in the high ratio but in reversed direction, by reversing the supply leads x and y in the eight pole motor connections.

It will be seen that the transmission of the system, for speed and torque changes with power transmission, alters its character during the progressive ratio changes. That is, in the high ratio ranges, i. e., low and second "gear," the transmission is a torque converter; whereas in the low ratio ranges, i. e. in third and high "gear," the transmission or drive functions as a slip clutch or slip coupling. As the motor parts are inactive and disconnected in these latter ranges, no electrical indications are available from the motor parts. However, the generator parts are in action in all ratios.

In the high reduction ratios, of low and second gear, when the drive or transmission functions as a torque converter, assuming a given order of R. P. M., which may or may not be true, depending upon whether the fuel supply to the motor is adjusted to effect this constant motor speed, for instance 2000 R. P. M., the voltage and current values available from the transmission are practically identical. Although the generator delivers the same value in H. P. in both ratios, the speed and torque are different in the output shaft 12 of the transmission, resulting from the different pole combinations in the motor parts of the drive or transmission. In these higher ratios there is a high normal voltage and current circulating in the drive, as in any motor and generator combination.

In the third speed or ratio, as noted, the motor parts of the drive are electrically disconnected, and the generator output is connected to the recited resistors, in a manner to be explained. The transmission, operating then as an electric slip coupling, has a fair rate of slip, due to the resistor in the generator circuit, effecting a smooth transition step of the normal torque of motor 7, or, which is more probable, with vastly greater than normal torque, if such is available from motor 7, and the throttle is correspondingly opened to a degree in excess or beyond that associated with normal "cruising" speed of said motor 7, and producing a low voltage but fairly high current.

In high, or the effective 1:1 transmission of the drive, the generator output is shorted, substantially at the slip rings, so that there is no voltage available, of adequate amplitude as to be useable for indication functions. However, the current available in the 1:1 connection is high. It will be seen therefore that in a tabulation of characteristics of the drive in its several ratios, the following appears:

| Ratios or "gear" | Voltage | Current |
| --- | --- | --- |
| Low | normal | normal. |
| Second | do | Do. |
| Third | low | fairly high. |
| High | substantially nil | high. |

Obviously there is one common factor in all of the ratios, namely the current or amperes. Moreover, the current at all four stages is more than sufficient in strength as to furnish adequate power to effect switching from the load current, between the stages or ratios, without the use of auxiliary power sources, such as batteries, or the like. It is a feature of the invention to utilize the circulating current to supply the impulses or indications at the right time to effect the ratio shifting at precisely the proper moment, without considering the voltage at all. The current, or load, is utilized herein to operate the main power switches or relays or contactors themselves, and also to provide the time interval for the actuation of the switches in shifting in either direction, between ratios.

As the voltage of the load current is very low, and for all practical purposes is near zero, when the drive runs in the high speed connection, because the generator is short circuited, the current transformer 120 is used to obtain a suitable source of voltage and current for the switching operations. For this purpose the primary winding 121 consists of a few turns of heavy wire, able to carry the full load current of the transmission or drive. As noted, the primary 121 is connected directly in the line with an illustrative generator output, z, of the generator. Suitable voltage and current for operating the main current-carrying relays and contactors, is obtained from the secondary 125 of the transformer, as inappreciably affected and controlled by the effects of the main primary 121 and the respective compensator windings 122, 123, and 124 in their respective induction effects.

Let it be assumed that certain arbitrary, but purely illustrative, values of current or voltage are necessary to move the armature 31—32 of the pilot relay different degrees or to different angular settings, against the bias of spring 29. For instance, let it be assumed that from the position of rest shown in the diagram it requires 10 volts to drive enough current through coils 23 and 24, so that the armature 31—32 moves clockwise just far enough to cause arm 34 of switch 33 to snap from the "on" contact 36 to the "off" contact 38; that it requires 11 volts to move roller 30 far enough to cause switch 43 to snap from the "on" contact 44 to the "off" contact 46; and that it requires 12 volts to move roller 30 far enough to force switch 50 from the "on" contact 52, to engagement with the "off" contact 54.

Let it be also assumed that, on the pilot relay armature counterclockwise return movement, which takes place on a falling voltage, the different switch positions in reverse order are attained at the same voltage levels. Of course, this may not actually be true, as, due to friction, inertia, and hysteresis, there may be a slight difference according to the directions of the arcuate movements. However, as the voltage used is A. C., which causes a vibrating action, the delay or lag is so immaterial that it can be ignored. Obviously, the electrical values ascribed to the pilot relay armature positionings are illustrative and not limitative, and other values may equally well be utilized, according with turn ratios, resistances, spring tensions, and the like.

Let it be assumed that the engine or motor 7 is started and is running at idling speed, and all parts of the system including the rear axle 8 are at rest and in the starting position shown.

To start the car in motion, switch 21 is closed, if this happened to have been opened for any reason. Normally this would remain closed in order to close the D. C. current for the exciter winding 17 as far as switch 19. Of course, if forward creep of the car at idling is not objectionable, switch 19 can be omitted, but preferably it is provided and used. The operator advances the throttle, as by stepping on the throttle pedal 20, as is conventional with automatic devices. However, unless the exciter winding 17 has been energized, the only result would be increased engine R. P. M. with no driving power whatever, because, as noted, the transmission, without exciter current, is in perfect neutral. The car would not even creep if the engine was rotated at full power and the car brake is off. Switch 21 or 19, or both, therefore, when open provide means for effecting a positive neutral position for starting or testing the motor, etc. With the switch 21 closed, the released or impressed throttle opens switch 19 and holds it open under both running and stationary conditions and effectively disconnects the motor 7 and the rear axle 8. This establishes free wheeling at any car speed.

However, with the engine idling and switch 21 closed, pressure on the pedal 20, synchronously closes switch 19 as the motor R. P. M. increases, and the generator rotor of the drive or transmission is properly excited by the closing of the switch 19, and immediately generates polyphase current in leads $x$, $y$, and $z$, and the generation of transmission and control currents begins.

In order to generate control currents in the transmission there must be at the outset, somewhere in the drive, a closed main circuit. This circuit for control current purposes includes the primary winding 121, of transformer 120, to furnish available basic current for the relays and contactors. With all main contactors or relays open or "off" as indicated in the figure, this control current circuit exists from generator output lead $z$, from its brush and slip ring, through the primary 121 of the transformer, to the "on" contact 101 of relay 90, to the "on" contact 75, of relay 60, through primary section compensator winding 123, to input stator lead L4. Generator output leads $x$ and $y$ follow similar courses, but without passing through any primary compensating windings, and finally end at L5 and L6 of the stator input leads. It is to be observed that the compensator winding 123 is so organized as, additively, or subtractively, to effect an induced voltage of the illustrative approximate 10 volts in secondary 126

Current will flow from the generator in part over the transformer to the stator when the switching by the control relays so determine. As the driven shaft 12 of the transmission, which is mechanically connected to the car through axle 8, stands still, the slip of the high speed generator rotor, against the then stationary generator armature is 100%. A relatively high voltage is generated, and this, at first sight, might seem to result in a somewhat excessive current circulating in the drive or transmissions, which also would cause a strong torque reaction on driven shaft 12. However, at this point relay 80 is open or unenergized, so that there is not then a fully completed four pole connection. This modifies the current and torque which, under normal conditions will hardly be able to start the vehicle into motion. If this is assumed, for a particular starting load condition, a functioning of the transmission system is necessary. Transformer winding 121 and compensator primary winding 123 are both in the primary circuit, and almost instantaneously the voltage and current in the transformer secondary windings 125 and 126 reach sufficient values to operate the main relays or contactors and the pilot relay respectively, assuming, of course, that the foot throttle has been depressed sufficiently as to gain the necessary engine R. P. M. The pilot relay 22 at this moment is in its static rest position shown, as it is in the high gear, 1:1 ratio that the coils are insufficiently supplied with current to pull in the armature to move the roller 30 clockwise, in differentiation from what may be called a reversed static rest position when the maximum current is flowing in the pilot relay coils for an angular setting at which the roller 30 moves counterclockwise with decrease of current in the pilot relay coils.

With the pilot relay in said static rest position shown, current flows from the secondary 125, across switch 69, through lead 35 to the made contact 36 of pilot relay switch 33 through lead 37, actuating coil 111 of relay 110. The current returns through common return 39, common to all actuating coils of the relays, through the carbonpile regulator 135 back to secondary winding 125, completing the circuit. Energization of actuating coil 111 throws relay 110, which directly short-circuits the generator leads $x$, $y$, and $z$. Instantaneously, therefore, there is no effective voltage from the generator for driving a current through the stator windings of the motor or through the compensator primary winding 123, and the drive or transmission is, therefore, in the high, or 1:1 ratio of transmission.

In passing, it may be noted that the pilot relay has been adjusted and regulated so that it will just about stay in the static rest condition at normal engine load.

Normal engine torque at normal load will hardly be adequate to start the car or vehicle moving quickly in any case, and the current circulating through the pilot relay coils 23 and 24, from transformer secondary 126 is now sufficient to pull in the armature legs 31 and 32 against the tension of spring 29. At 10 volts, as previously assumed, the armature is now advanced far enough to snap switch 33 to the "off" position. This cuts the current to the actuating coil 111 of relay 110 and switches it over to the actuating coil 91 of relay 90. The current from lead 35 now goes to normally open "off" contact 38 of switch 33, through lead 41, to the movable element 42 of switch 43, through normally closed "on" contact 44 to lead 45, through actuating coil 91 of relay 90 to return line 39. By this functioning of the pilot relay the main contactor or relay 110 drops out, and relay 90 pulls in, thereby connecting the generator output leads x, y, and z to the respective resistances 151, 152, and 153 of the three phase resistor 150. As noted, the z lead in circuit with the resistor 153, is through the compensator winding 122 of the transformer 120.

The compensator winding 122 and its resistor R, if used, are so organized as to the instantaneous magnetic flux in the core of transformer 120 as to maintain the proper value in voltage and current on the coils 23 and 24 of the pilot relay, so that the armature thereof stays substantially in the set position at which the switch 43 continues to close contact 44 of switch 43, substantially regardless of fluctuations of the main current circulating in the drive, of an assumed fairly constant speed of motor 7, so that the relay remains in the right position for this purpose despite main current change. With relay 90 energized, the generator is still disconnected from the motor and by reason of the resistors in the circuit, functions as a slip clutch of greater slip than in the high 1:1 ratio effected by relay 110.

If the torque of the engine is still too low to start the car, and the voltage in the pilot relay raises to the illustrative 11 volts, the armature 31—32 thereof advances still further, and causes the movable arm of switch 43 to move away from and break contact with contact 44 and to establish contact with normally open contact 46. This brings the current through lead 47 into the movable switch element of switch 50 and through normally made contact 52 and lead 53 through the actuating coil 81 of relay 80 to the common return line 39. This drops out relay 90. The actuation of relay 80 short-circuits stator leads L1, L2, and L3, through the shorting connection 89, joining contacts 86, 87, and 88 of relay 80.

At the same time generator current leads x, y and z are connected through the normally made or "on" contacts of relays 90 and 60 to the stator leads L4, L5, and L6. At this point compensator winding 122 is out of the circuit, while compensator winding 123 is in the circuit as part of the transformer primary, maintaining the right voltage on the coils of the pilot relay, regardless of any change which may occur in the value of the circulating main current. The generator current through leads x, y, and z is supplied to the stator, and the transmission or drive has changed from a slip clutch to a slip clutch combined with a torque converter, and is now in the second lowest speed or four pole connection.

If the car has still not started, by reason of inadequate torque for the purpose, and the voltage actuating the pilot relay raises to the illustrative 12 volts, thus pulling the armature all the way in to coils 31—32, the angular motion of the roller 30 relative to shaft 27 forces the movable element 48 to snap from made contact 52, and to make contact with the normally "off" contact 54. This causes relay 80 to drop out, and directs the current through the actuating coil 61 of relay 60, to the common return 39. The relay 60 is pulled in as relay 80 drops out. This drops out compensator coil 123 and brings in compensator coil 124 in line with generator output z, and connects the generator leads x, y and z respectively to the stator input leads L1, L2 and L3, or the eight pole connection of the motor. The drive or transmission is now in low gear and high torque low speed ratio, and the car starts moving ahead.

The whole operating process, as described in detail is the initial "downswitch" stroke. In real operation it takes place very rapidly, and starting with the initial high gear ratio, needs only proceed downwardly just to that stage at which the delivered torque is adequate to start the vehicle or car. In other words, according to the instantaneous load situation, the downswitching occurs only to that stage at which the torque is adequate to start the vehicle. Obviously, if the car is on a hill pointing downwardly (an illustrative extreme example of one sense of small load) the mere release of the brake as the power is applied to the motor may cause such coincidence between required and delivered torque in high gear that no downswitching occurs or needs to occur. On the other hand, if the car or vehicle is pointing upwardly on a steep hill (an illustrative extreme example of an opposite sense of a great load), it is necessary that the required torque for starting is only to be accomplished by the lowest gear, so that a complete downswitching through all of the stages is necessary. As noted, this does occur very rapidly so that the lag in the actual start from the beginning of the power increase to the actual movement of the vehicle may be inconsequential. However, to reduce even this small delay, it is proposed to incorporate suitable time delay means into at least the intermediate stage control relays so that under extreme load conditions, such as the steep hill and the uppointing vehicle, for instance, a short delay before the operation of the respective relays would occur, so that there would be no time for them to operate and the initial downshift would be from the normal high gear ratio at which the transmission starts with the vehicle at rest and the engine idling, directly to the low gear, high torque slow speed ratio. This would in a simple manner entirely omit the intermediate steps or stages. Of course, such time delay devices are well known in the art and any such as are desired can be so used.

At one given stage, therefore, and let it be assumed to be low gear, the car or vehicle starts moving. It will be understood that the rate of acceleration and the time that the car remains in low gear in under the control of the operator, and is a function of the amount of throttle opening. As the car is then moving, and as it accelerates, the squirrel cage armature of the motor part of the drive, mounted on the driven shaft, revolves at a progressively increasing rate relative to the stator of the transmission, and therefore develops a progressively increasing counter E. M. F. The current circulating in the transmission unit and in the transformer windings, falls, and the system is functionally ready and operative to start the "upswitching" or reverse progression toward high gear ratio.

The upswitching process, occurring on a falling current, is practically the same action, in reverse, as the initial downswitch stroke on a rising current. It is important to note, however, in the upswitching case, that the action is not as rapid, and no steps are omitted even if said time delay devices are associated with the relays. Assuming the lowest gear or speed connection, when the car has attained sufficient acceleration as to cause the main current to fall to a general normal, this fact is reflected in the secondary transformer windings and in the coils 23—24 of the pilot relay, and the armature 31—32 thereof will be progressively returned to its static rest condition under the bias of the spring 29. This return motion of the armature, however, is not a smooth action. As 12 volts has been assumed to be the voltage necessary to hold the roller 30 of the pilot relay in the lowest speed position, i. e., engaging the wiper end 51 of the movable element 48 and holding the latter against the contact 54, a decrease of the voltage to the illustrative 11 volts will cause the armature to yield to the bias and start its return toward the static rest condition, and in due course switch 50 will be released by the roller, causing the relay 60 to drop out and the relay 80 to be pulled in. This puts the drive or transmission in second gear, which will synchronously raise the current in the drive. This elevation of the value of the current will naturally arrest the return motion of the armature of the pilot relay, and, indeed, it may cause it to move slightly angularly in the clockwise reverse direction, but not far enough to cause it to again actuate switch 50. As the vehicle further accelerates in second gear to a higher speed in R. P. M., the current again falls, by progressively increasing counter E. M. F., as will be understood, and when it reaches a value of the illustrative 10 volts in the coils of the pilot relay, switch 43 is snapped to the "on" condition with contact 44. This, of course, drops out relay 80 and pulls in relay 90. As noted, this places the transmission in third gear. As this again raises the main current, this will again arrest the return movement of the armature of the pilot relay toward the static rest condition, waiting for still further acceleration of the car or vehicle.

In third gear at this point, the same process is repeated, i. e. the current falls as the car gains more speed, and the pilot relay returns to its static rest condition under the bias of the spring 29, forcing switch 33 to its "on" or made position, at less than the illustrative 10 volts, say, for instance, at 9 volts. This will cause relay 90 to drop out and relay 110 will be pulled in. The car is now in high gear, or the highest speed 1:1 ratio.

In the high gear position or condition the compensator windings 122, 123 and 124 are all out of action. However, primary 121 is still in the circuit supplying current to the coil of contactor or relay 110, holding the latter in the "on" position. It may be noted that the nature of the current now flowing through the coil 111 of the relay 110 at the high speed running condition is different from its nature when relay 110 was in its unactuated condition prior to the downswitch stroke. This is due to the fact that at the start of the downswitch stroke the transmission was completely a generator slip, with a resulting high voltage and frequency, the excess of which voltage was taken care of by the regulator means 135, 133, and 134, and the car was standing still. On the contrary, in the high speed running condition, the slip R. P. M. in the generator of the transmission may be very low, as may also be the frequency, with the exact values depending upon conditions, such as throttle opening, load, road conditions, and whether the car is being further accelerated, or is being driven at a constant speed. Under load in high gear, there is a strong ampere current circulating in the generator of the drive, and it is not difficult to produce therefrom sufficient voltage and current to hold the relay 110 in the "on" or made position. However, when the frequency is low it may cause the relay to drop off during each cycle, when the voltage is low, producing a more or less rapid vibration or chattering. To avoid this in the instant invention, the pawl 116 and its dash pot, ratchet 78 and coil 117 are used to lock the relay for short periods of time. Of course, the locking device shown is purely illustrative and any other devices for preventing chattering and the like of A. C. relays may be used in place thereof.

It will be seen from the foregoing that a car or vehicle equipped with the instant invention can be automatically and quickly accelerated through all of the necessary different speed-torque ratios in both downswitching and upswitching, up to a speed of, say, for example, 30–35 M. P. H., at which the normal torque of the motor is usually sufficient to take care of all further accelerations and ultimate high speeds. It is worthy of note, however, that the speed at which the transmission shifts into high gear is not necessarily the stated 30-35 M. P. H. If the operator desires more rapid acceleration, and opens the throttle accordingly, the transmission will stay in the lower gear steps, until accordingly higher points of speed are reached for each step, and actual high gear may not be attained until the vehicle reaches 40, 45, or more M. P. H. It all depends upon whether the car is on an up or downgrade, upon the load, and upon the rate of response to and the actual rate of throttle opening.

It frequently happens that, driving at a reasonable speed, the driver wishes extra quick and rapid acceleration, as, for instance, to pass another car. The transmission system herein will respond quickly, switching to one or more steps of lower gear, depending upon load conditions and how much and how fast the accelerator pedal is depressed and the throttle is opened.

In the event it is desired to establish and hold a low gear ratio for a particular interval for a special problem, as in getting out of mud, snow, or the like, the hand lever 68 is actuated, which opens switch 69, actuates and holds the relay 60 "in" and the system in the low gear condition of high torque and low speed. In reversing the car, as noted, lever 68 is also actuated before or simultaneously with reversing switch 143, so that the reversing is in the low gear ratio only.

It will be understood that the generator rotor 16 may comprise permanent magnets, or that the excitation of the generator rotor can be accomplished in any desired manner in alternation to the specific D. C. source indicated, as, for instance, by self-excitation.

Finally, it is to be understood that the invention is not limited or restricted to automotive vehicles. The term "automatic transmission" as used in the appended claims is intended to be applicable to a device of automatically variable torque-speed ratio of input to output, interposable between any power plant and any designated load, hereinafter designated together as an organization. While primarily intended for automotive use in a broad sense, i. e., in automobiles, trucks, diesel locomotives, vessels, tug boats, and other forms of ships, aircraft and the like, it is also available and is contemplated for use in any organization as the driving connection between a power unit and any load such as machinery, tools, and the like, as, for instance, in rolling mills, and the like.

Having thus described my invention, I claim:

1. A transmission comprising a dynamoelectric unit having an input shaft for coupling to a prime mover and an output shaft for coupling to a load, means in the unit developing load currents variable in amplitude in response to relative rotations of the input and output shafts, means for utilizing said load currents for changing the ratio of input to output between the respective shafts, and means responsive to variations in amplitude of said load currents for determining the time for changing said ratios.

2. A transmission having an input shaft for coupling to a prime mover and an output shaft for coupling to a load, said transmission comprising a generator having rotatable rotor and armature members, one of which is driven by the input shaft and the other of which is in coupled relation to the output shaft, said generator comprising a transmission unit having a polyphase output, a motor comprising a transmission unit formed of field and armature members, one of which motor members is mounted for rotation with the generator member coupled to the output shaft, and an electrical system comprising a pilot relay mounting switches, and a plurality of main contactors, said pilot relay switches controlling the actuation of the respective main contactors, transformer means responsive to a generator output for actuating the pilot relay and the respective main contactors for selectively supplying said motor with said generator output to establish said transmission as a torque converter of high ratio of input to output, or for shorting out said generator output to put the said motor out of action and to cause the generator to function as a slip clutch to establish said transmission as of low ratio of substantially 1:1 ratio of input to output.

3. A transmission having an input shaft for coupling to a prime mover and an output shaft for coupling to a load, said transmission comprising a generator having rotatable rotor and armature members, one of which is driven by the input shaft and the other of which is in coupled relation to the output shaft, said generator comprising a transmission unit having a polyphase output, a motor comprising a transmission unit formed of field and armature members, one of which motor members is mounted for rotation with the generator member coupled to the output shaft, and an electrical system comprising a pilot relay mounting switches, and a plurality of main contactors, said pilot relay switches controlling the actuation of the respective main contactors, transformer means responsive to a generator output for actuating the pilot relay and the respective main contactors for selectively supplying said motor with said generator output to establish said transmission as a torque converter of high ratio of input to output, or for shorting out said generator output to put the said motor out of action and to cause the generator to function as a slip clutch to establish said transmission as of low ratio of substantially 1:1 ratio of input to output, said electrical system including resistive means and said main contactors operative to connect the generator supply to said resistive means to establish the generator as a slip clutch with a higher slip rate than that of said substantially 1:1 ratio.

4. A transmission having an input shaft for coupling to a prime mover and an output shaft for coupling to a load, said transmission comprising a generator having rotatable rotor and armature members, one of which is driven by the input shaft and the other of which is in coupled relation to the output shaft, said generator comprising a transmission unit having a polyphase output, a motor comprising a transmission unit formed of field and armature members, one of which motor members is mounted for rotation with the generator member coupled to the output shaft, an electrical system comprising a pilot relay mounting switches, and a plurality of main contactors, said pilot relay switches controlling the actuation of the respective main contactors, transformer means responsive to a generator output for actuating the pilot relay and the respective main contactors for selectively supplying said motor with said generator output to establish said transmission as a torque converter of high ratio of input to output, or for shorting out said generator output to put the said motor out of action and to cause the generator to function as a slip clutch to establish said transmission as of low ratio of substantially 1:1 ratio of input to output, one of said units wired to effect two different sets of poles, means for electrically connecting the generator and motor to one set of poles of said unit to establish one given high ratio, and means for electrically connecting the generator and motor to the other set of poles of said unit to effect a different high ratio of input to output.

5. A transmission having an input shaft for coupling to a prime mover and an output shaft for coupling to a load, said transmission comprising a generator having rotatable rotor and armature members, one of which is driven by the input shaft and the other of which is in coupled relation to the output shaft, said generator comprising a transmission unit having a polyphase output, a motor comprising a transmission unit formed of field and armature members, one of which motor members is mounted for rotation with the generator member coupled to the output shaft, an electrical system comprising a pilot relay mounting switches, and a plurality of main contactors, said pilot relay switches controlling the actuation of the respective main contactors, transformer means responsive to a generator output for actuating the pilot relay and the respective main contactors for selectively supplying said motor with said generator output to establish said transmission as a torque converter of high ratio of input to output, or for shorting out said generator output to put the said motor out of action and to cause the generator to function as a slip clutch to establish said transmission as of low ratio of substantially 1:1 ratio of input to output, said electrical system including resistive means and said main contactors operative to connect the generator supply to said resistive means to establish the generator as a slip clutch with a higher slip rate than that of said substantially 1:1 ratio, one of said units wired to effect two different sets of poles, means for electrically connecting the generator and motor to one set of poles of said unit to establish one given high ratio, and means for electrically connecting the generator and motor to the other set of poles of said unit to effect a different high ratio of input to output.

6. A transmission comprising a dynamoelectric transmission device having an internal current development functional with relation to motions of an input and an output shaft, a pilot relay having switches operable as functions of the setting of the relay derived by balance between a mechanical and an electrical bias, a main relay operable by a switch of the pilot relay, and transformer means responsive to fluctuations of said internal current for applying electrical bias to said pilot relay and to energize the main relay in response to actuation of a switch of said pilot relay to change the ratio of transmission of said device.

7. In transmissions, a driving input shaft for coupling to a prime mover, a driven output shaft for coupling to the load, a transmission unit in which both shafts are mounted, the transmission unit comprising a generator and a motor, said generator comprising rotor and armature generator members of which one member is mounted to rotate with the driving shaft and the other member is mounted to rotate with the driven output shaft, said generator operative as a slip clutch between the respective shafts, said unit further comprising a motor formed of a field member and an armature member, of which one member is mounted for rotation with the generator member mounted to rotate with the driving shaft, the field member of said motor being wired to effect two sets of different numbers of poles with each set having separate leads, a control system operative to connect the generator and with one set of poles of the motor for one ratio of output from the transmission, said system operative to connect the generator and the other set of poles of the motor for another ratio of output of the transmission, in functioning with the generator parts as a torque converter, and means for actuating the control system as a function of the changes of current from the generator.

8. In transmissions, a driving input shaft for coupling to a prime mover, a driven output shaft for coupling to the load, a transmission unit in which both shafts are mounted, the transmission unit comprising a generator and a motor, said generator comprising rotor and armature generator members of which one member is mounted to rotate with the driving shaft and the other member is mounted to rotate with the driven output shaft, said generator operative as a slip clutch between the respective shafts, said unit further comprising a motor formed of a field member and an armature member, of which one member is mounted for rotation with the generator member mounted to rotate with the driving shaft, the field member of said motor being wired to effect two sets of different numbers of poles with each set having separate leads, a control system operative to connect the generator and with one set of poles of the motor for one ratio of output from the transmission, said system operative to connect the generator and the other set of poles of the motor for another ratio of output of the transmission, in functioning with the generator parts as a torque converter, means for actuating the control system as a function of the changes of current from the generator, and means operated by the control system for interrupting the electrical connection between the generator and motor to establish a different ratio of output of the transmission to cause it to function as a slip coupling or clutch.

9. A control system for dynamoelectric transmissions for operative association with an input shaft and an output shaft and having a plurality of input-to-output ratios controllable by main relays, comprising dynamoelectric transmission means in said transmission productive of amplitudes varying functionaly with the load on the output shaft, main relays actuated by said currents and operative to switch said currents to effect changes in said transmission ratios, a pilot relay including switches controlling said main relays and responsive to changes of amplitude of said internal currents to selectively actuate said main relays, and connecting means between said transmission means said pilot and main relays to conduct said internal currents.

References Cited in the file of this patent

UNITED STATES PATENTS

| | | |
|---|---|---|
| 732,062 | Entz | June 30, 1903 |
| 1,773,842 | Neuland | Aug. 26, 1930 |
| 2,071,855 | Schaelchlin | Feb. 23, 1937 |
| 2,157,926 | Suits | May 9, 1939 |
| 2,469,799 | Valle | May 10, 1949 |